W. G. BORN & J. L. LANE.
STERILIZER AND THE LIKE.
APPLICATION FILED OCT. 19, 1914.
1,177,846.
Patented Apr. 4, 1916.
4 SHEETS—SHEET 3.
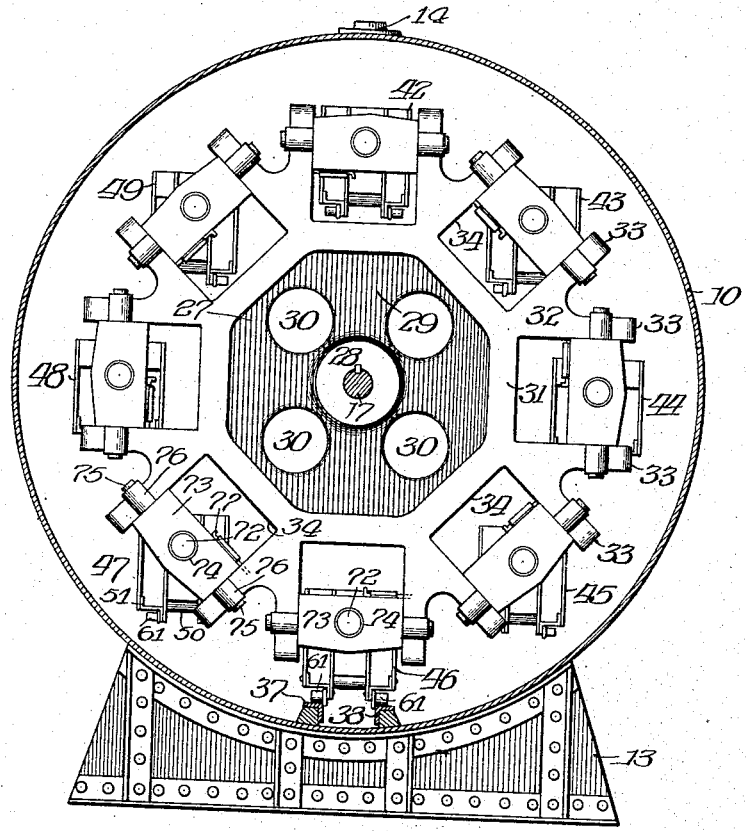
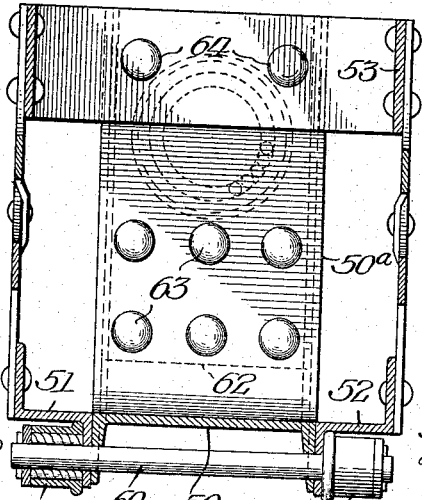

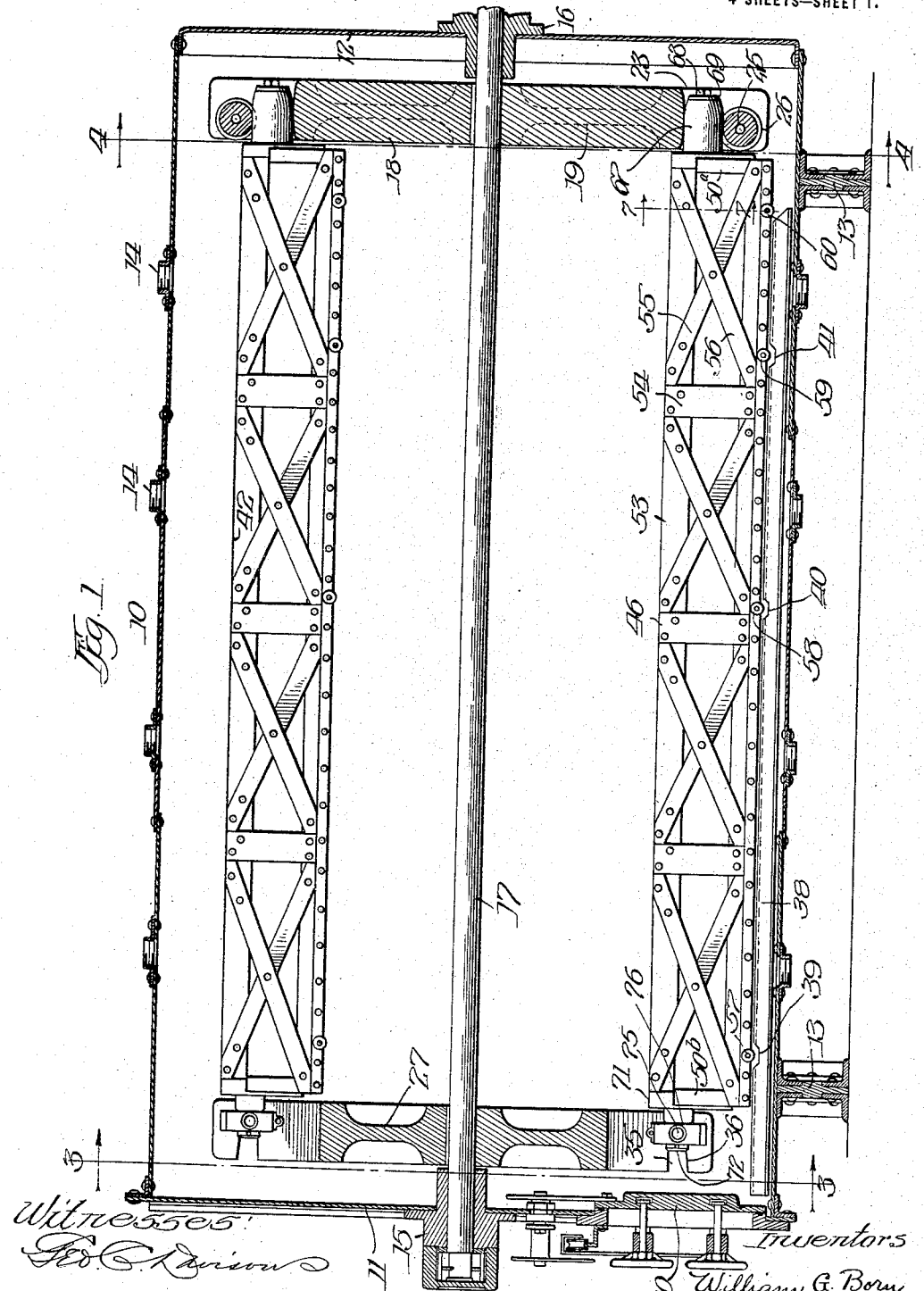

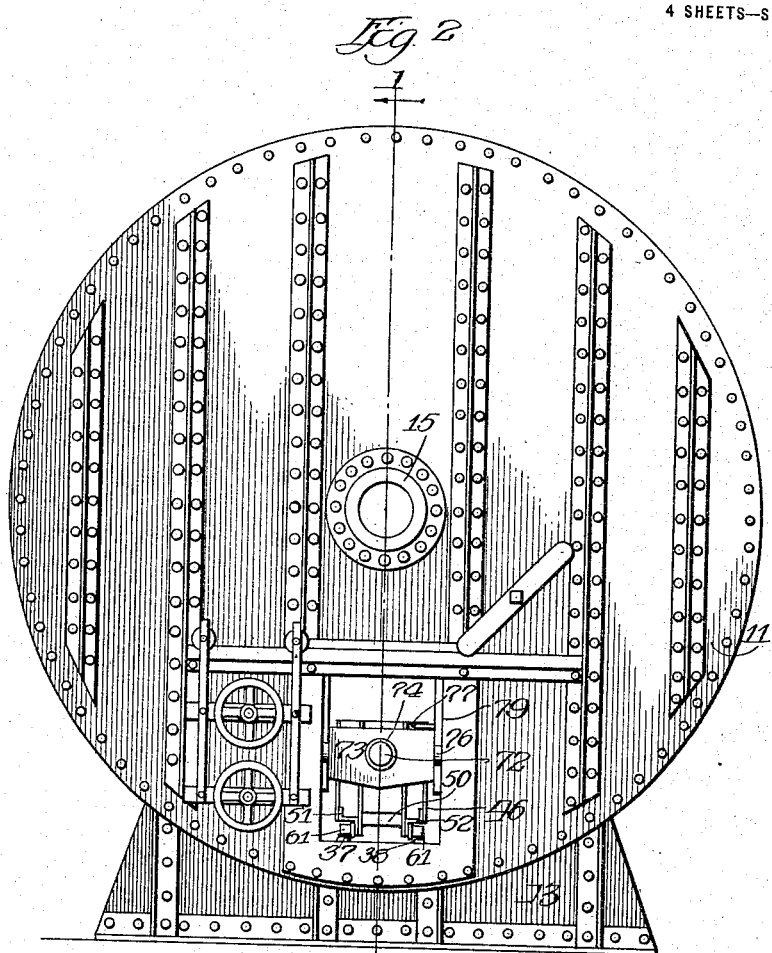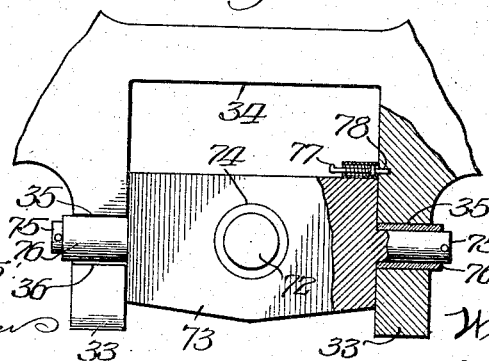

W. G. BORN & J. L. LANE.
STERILIZER AND THE LIKE.
APPLICATION FILED OCT. 19, 1914.
1,177,846.
Patented Apr. 4, 1916.
4 SHEETS—SHEET 4.
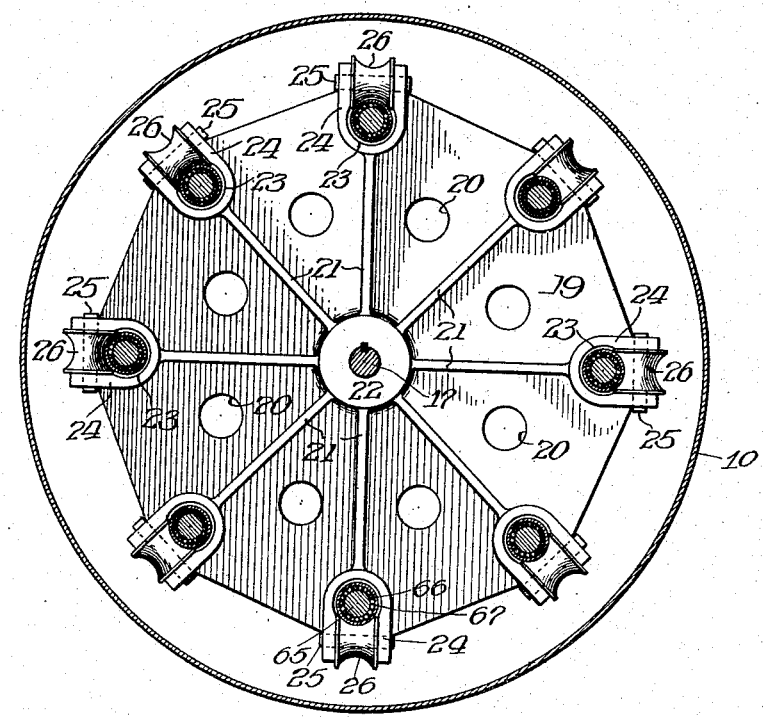
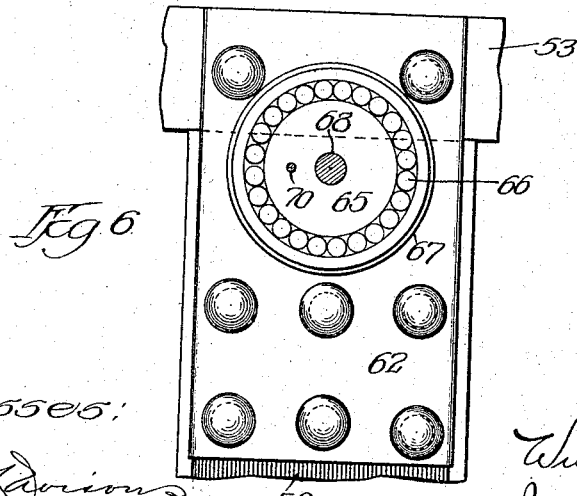
Witnesses:
Inventors
William G. Born
James L. Lane
By Walter M. Fuller
Atty.
THE COLUMBIA PLANOGRAPH CO., WASHINGTON, D. C.

UNITED STATES PATENT OFFICE.

WILLIAM G. BORN AND JAMES L. LANE, OF CHICAGO, ILLINOIS, ASSIGNORS TO JOHN MOHR & SONS, OF CHICAGO, ILLINOIS, A CORPORATION OF ILLINOIS.

STERILIZER AND THE LIKE.

1,177,846.

Specification of Letters Patent. Patented Apr. 4, 1916.

Application filed October 19, 1914. Serial No. 867,484.

*To all whom it may concern:*

Be it known that we, WILLIAM G. BORN and JAMES L. LANE, a subject of the Emperor of Germany and a citizen of the United States, respectively, residing at Chicago, in the county of Cook and State of Illinois, have invented certain new and useful Improvements in Sterilizers and the like, of which the following is a specification.

The present invention pertains to features of novelty and improvement in heaters, sterilizers, pasteurizers, and the like, and its leading purposes and objects are the production of a device of this character which shall be simple in structure, economical to manufacture, effective in operation, and so constructed that the goods or articles to be treated may be loaded into and discharged from the appliance with ease and despatch.

The invention is particularly adapted for embodiment or incorporation in a sterilizer for milk cans or bottles, or the like, but it is understood that its use is not limited in this respect.

In the preferred embodiment of the invention the sterilizer tank or container has within it revoluble means or spiders adapted to support and rotate a number of carriers or cradles, each loaded with the milk cans or bottles, such cradles constituting trucks or wheeled-carriages, whereby they can be readily inserted and withdrawn from the casing by the employment of a suitable supporting trackway. Such truck cradles are so associated with the revoluble means in the casing or shell that they are free to rotate on their own trunnions and in this way, always maintain their horizontal disposition and do not turn over.

Another salient feature of improvement resides in the provision of means whereby the cradles are not free to be moved or rotated by the revoluble spiders in the casing unless they have been fully and properly inserted in the appliance. Stated differently, the device is so constructed that by the mere act of insertion of the cradle or truck in the casing or shell its weight is automatically shifted from the supporting trackway to the spiders so that it is ready for rotation.

These, with other features of novelty and improvement will be apparent to those skilled in the art from the following detailed description of a preferred embodiment of the invention, which is illustrated in the accompanying drawings forming a part of this specification, and to which reference should be made in considering the description of the construction and operation of the device.

In these drawings: Figure 1 is a longitudinal vertical central section through the appliance with a number of the cradles or carriers omitted for the sake of clearness of illustration, the section being taken on line 1—1 of Fig. 2 with the door in its closed position; Fig. 2 is an elevation of the left-hand end of the appliance shown in Fig. 1, the door being shown in open position; Fig. 3 is a vertical cross-section on line 3—3 of Fig. 1; Fig. 4 is a vertical cross-section on line 4—4 of Fig. 1; Fig. 5 is a fragmentary elevation and partial section of the front spider and the trunnion block of one of the carriages; Fig. 6 is a detail section through the rear end trunnion of one of the cradles or carriages; and Fig. 7 is a transverse section through one of the cradle-trucks on an enlarged scale on line 7—7 of Fig. 1.

Referring to the drawings it will be observed that the appliance comprises a cylindrical sheet-metal shell 10 equipped with front and rear walls 11 and 12, the shell or casing being mounted on suitable saddles or supports 13, 13, and supplied with any desired number of pipe-connections 14, 14, for the introduction of steam or other heating media. The front and rear walls are equipped with the bearings 15 and 16 accommodating the shaft 17 which extends through the rear bearing 16 and is driven or rotated by any suitable mechanism, not shown. At its rear portion inside of the casing or shell, the shaft 17 has keyed thereto a ribbed support or spider 18 consisting of a cast-steel or plate-portion 19 apertured at 20, 20, and supplied with a plurality of ribs 21 radiating from the central hub 22. This spider, at the end of each rib, is recessed at 23, the recess being bounded by the marginal rib 24, the two ends of which project beyond the periphery of the spider forming supports for a pin or shaft 25 revoluble on which is a concave roller 26, the curved surface of which, in conjunction with the companion curved surface of the rib 23 forms a substantially cylindrical opening or bearing for the rear trunnion of the cradle truck described hereinafter. In the present instance eight of these rollers and trunnion bearings are shown, but of course, the number is immaterial and may be modified within wide limits.

In the casing at its front end a forward support or spider is keyed to the shaft, such spider being illustrated in elevation in Fig. 3. It comprises a central hub 28 keyed to the shaft and a surrounding cast-steel or plate-portion 29 of octagon shape apertured at 30, 30 and bounded by an octagonal marginal rib or enlargement 31. Extended outwardly from the part 31 is the plurality of arms 32 bifurcated at 33, 33, forming eight square or rectangular openings 34. Each of the arms 33 on its outer face has a recess 35, the outer wall 36 of which, (Fig. 1,) inclines slightly toward the shaft.

At the bottom of the casing inside of the same there is provided a pair of suitably supported angle rails 37 and 38 notched as shown in Fig. 1, at 39, 40 and 41 and terminating somewhat short of the position of the rear spider 18, as is fully shown. The appliance is also provided with a plurality of wheeled cradles or trucks 42, 43, 44, 45, 46, 47, 48, and 49, (Fig. 3), each of which has a bottom composed of an inverted channel bar 50, (Fig. 7), to the depending flanges of which are fastened the two Z-bars 51 and 52. A pair of bars 53 extend around the top of the cradle, being connected to the outer upstanding flanges of the Z-bars by suitable vertical and inclined bars 54, 55, and 56, these forming an open or lattice-work casing or carrier for the accommodation of the milk cans, bottles, or other containers for the material to be treated. Each cradle or carriage is equipped with four shafts 57, 58, 59, and 60, revoluble in bearings in the flanges of the bars 50, 51 and 52, and supplied at their ends with flanged rollers or wheels 61 adapted to travel on the horizontal flanges of the angle rails 37 and 38, as illustrated in Fig. 3. These shafts and their wheels or rollers are spaced apart on the cradle or carriage distances corresponding to the unequal distances between the notches of the rails forming the trackway so that when any of the cradle trucks is fully inserted in the casing, as shown in the lower portion of Fig. 1, all of its wheels or rollers will be free from the rails, the roller 60 being beyond the ends of the rails. The spacing or disposition of these rollers and rail notches is such that at all times the cradle will be supported on three bars or wheels except when the cradle reaches the position shown in Fig. 1, in which it will not be supported by any of the wheels. Obviously then, the cradle can be pushed into the casing or shell on the trackway and whenever any pair of wheels or rollers reaches one of the notches they cannot descend into the notches because the cradle will be supported on the remaining wheels. This does not hold true, however, when the cradle is fully pushed home, for as shown in Fig. 1, the cradle is then supported by the shaft spiders, as described hereinafter. The rear end of each of these cradle trucks or carriages is preferably formed by bending upwardly a portion 50ᵃ of the bottom channel-bar 50, which accommodates between its flanges a block 62 fastened to the upturned web of the channel by the rivets 63, and secured to the upper cross-bar 53 by the rivets 64, as is shown on a somewhat enlarged scale in Fig. 6. This block carries an outwardly extended stud-shaft 65 around which are grouped the rollers 66 on which a trunnion-shell 67 is adapted to revolve, the parts being held in place by a cap-screw 68, (Figs. 1 and 6), coöperating with a washer 69 provided with a dowel-pin 70. It should be understood that Fig. 6 is a section just inside of the washer so that the cap screw and dowel pin are in section, the other parts being in elevation. It should be observed also that the trunnion 67 is somewhat tapered to facilitate its passage into its bearing on the spider 18, the bearing being composed in part by the coöperating concave-roller 26.

The front end 50ᵇ of each of the carrier-trucks is desirably formed by bending upwardly the end of the bottom channel 50 so as to accommodate between its flanges a block 71 riveted thereto and to the top-cross-bar 53, this block having integral therewith a shouldered projection, the smaller cylindrical part 72 of which constitutes the trunnion. On this trunnion is fitted an apertured trunnion bearing block 73 provided with a cylindrical bronze bushing 74 receiving the trunnion 72. The main body of this block is of substantially rectangular form, as shown in Fig. 5, and is adapted to be received between the pair of arms 33, 33. Extended from the opposite ends of this block are a pair of stud-shafts 75, 75, each equipped with a steel or bronze sleeve 76, these two sleeves being adapted to be received in a pair of recesses 35, 35, of the companion arms 33, 33. In order to lock the bearing block in place in the front spider, it is supplied with a spring-pressed catch 77 adapted to enter a suitable aperture 78 in one of the arms 33 when the block is properly inserted in position.

At its front end the casing or shell 10 is provided with an opening or doorway 79 adapted to be closed and sealed by an internal door 80, the construction and operation of which need not here be described, as it forms no part of this present invention.

Operation: The operation of this appliance takes place substantially as follows: Assuming that one of the cradles or trucks 46 has been charged or loaded with filled milk cans, bottles, or the like, and that the door 80 is open, the shaft 17 and its companion spiders 18 and 27 are rotated until one of the rollers 26 of the rear spider and the companion opening 34 of the front spider are in proper register with the trackway. Then the truck or cradle is pushed through the casing opening or doorway 79, the cradle rollers traveling on the companion rails of the notched trackway. As illustrated in the drawings, the doorway is not of sufficient width to permit the passage through it of the bearing-block 73 and its supports 75 in a horizontal position and to permit this passage, the block 73 is turned in a vertical position. As soon, however, as the block has passed through the doorway, it is turned down into horizontal position and the carriage pushed fully rearwardly on the trackway into the position shown in Fig. 1. The cradle trunnion 67 engages the roller 26 before the wheels or rollers of the cradle arrive at their corresponding notches or depressions in the trackway, and the bearings 76 enter the pair of recesses 35 before the wheels of the cradle reach the notches. When the cradle is fully pushed home so that its rollers are in register with the notches, the cradle will be supported at its opposite ends by the roller 26 and the block 73, the latter in turn being supported by the front spider. The block 73 is locked in place by the catch 77 and then the shaft 17 and the two spiders are rotated an eighth of a revolution for the insertion of the next cradle with its load of cans or bottles. This operation is continued until the full complement of cradles is inserted. Then the door 80 is closed fluid-tight over the doorway and the steam or other medium at proper temperature for sterilizing or pasteurizing is turned into the casing and the contents of the cradles are subjected to its heating action. The shaft and its supply of loaded cradles may or may not be rotated during the heating action, but it should be observed, however, that during the rotation of the spiders either during the sterilizing action or during their loading with the cradles, the latter are free to maintain their horizontal disposition, as illustrated in Fig. 3, this tendency being facilitated owing to the location of the front and rear trunnions above the centers of gravity of the cradles. Consequently, there is no danger of the cans or bottles turning over and they do not necessarily, therefore, have to be air or liquid-tight.

As soon as the sterilizing or pasteurizing action has been completed, the various cradles are withdrawn, as will be readily understood, the spiders being rotated so as to bring the cradles individually into register with the rails of the trackway. It will be apparent that each cradle will be supported by the trackway before its support with the spiders ceases.

If desired, the width of the casing doorway may be sufficient to permit the passage of the block 73 and its support 75 in a horizontal position, thus doing away with the necessity of turning it for its insertion and withdrawal.

It should be clear that during the rotation of the spiders, each cradle is sometimes supported by its coöperating concave roller 26 while at other times and at other portions of its revolution it is supported directly by the concave recess 23, the roller and recess forming a substantially cylindrical bearing for the trunnion, permitting its rotation therein.

To those skilled in this art it will be apparent that various minor mechanical changes may be incorporated in the structure shown and described without departure from the substance of the invention, and without the sacrifice of any of its substantial benefits and advantages. It is to be understood further that the term "spider" as used in this specification and in the appended claims is employed in its broad meaning and is not necessarily limited to the use of radiating-arms since any suitably shaped supports mounted on the shaft will properly perform the required supporting function.

We claim:

1. In a device of the character described, the combination of a shell or casing, a revoluble shaft in said casing, a recessed spider revoluble with said shaft, a roller mounted on said spider and associated with said recess, a cradle adapted to contain the articles to be treated and to be inserted in and withdrawn from said casing, and a trunnion on said cradle adapted to be inserted in and coöperate with said spider recess and roller, the wall of said recess and the roller forming a bearing for the trunnion, permitting the cradle to maintain its horizontal disposition throughout its rotative movement with the spider, substantially as described.

2. In a device of the character described, the combination of a shell or casing, a revoluble shaft in said casing, a spider mounted on and revoluble with said shaft, said spider having a recess with a concave surface, a roller with a concave surface mounted on said spider, a cradle adapted to contain the articles to be treated and adapted to be inserted in and withdrawn from said casing, a trunnion on said cradle adapted to be received in the space formed by said spider recess and the roller, the concave surface of the recess and the concave surface of the roller forming a bearing for said trunnion, whereby the spider is adapted to revolve the cradle through the trunnion, the latter turning in said bearing and permitting the cradle to maintain its horizontal position throughout its rotative movement with the spider, substantially as described.

3. In a device of the character described, the combination of a shell or casing, a revoluble shaft in said casing, a spider mounted on and revoluble with said shaft, a cradle adapted to contain the articles to be treated and adapted to be inserted in and withdrawn from said casing, a trunnion on said cradle, a trunnion bearing block, and a detachable connection between said bearing-block and said spider, whereby the cradle may be revolved by the spider and maintain its horizontal disposition throughout its rotative movements therewith, substantially as described.

4. In a device of the character described, the combination of a shell or casing, a shaft revoluble in said casing, a pair of spaced spiders on said shaft and revoluble therewith, a cradle adapted to contain the articles to be treated and to be inserted in and withdrawn from said casing, trunnions on the end-portions of said cradle, a bearing on the inner spider for one of said trunnions into which said trunnion is adapted to be longitudinally inserted and withdrawn, a bearing-block on the other trunnion, and a detachable connection between said bearing-block and the outer spider, whereby the cradle may revolve with the spiders and maintain its horizontal disposition throughout its rotative movement, substantially as described.

5. In a structure of the character described, the combination of a shell or casing, revoluble means in said casing, an interrupted trackway in said casing, a cradle adapted to contain the articles to be treated and equipped with wheels adapted to travel on said trackway, and detachable connections between said cradle and revoluble means adapted to become operative to support the cradle on said revoluble means before the wheels of the cradle reach the interruptions of the trackway on the inward travel of the cradle, the cradle being free to turn with said revoluble means when said wheels register with the trackway interruptions, substantially as described.

6. In a structure of the character described, the combination of a shell or casing, a shaft revoluble in said casing, a pair of spiders mounted on said shaft and adapted to rotate therewith, a notched trackway in said casing, a cradle adapted to contain the articles to be treated and equipped with rollers adapted to travel on the trackway, and detachable connections between said cradle and spiders, the notches of the trackway permitting the cradle to rotate with the spiders when all of the cradle rollers are in register with the trackway notches, substantially as described.

7. In a structure of the character described, the combination of a shell or casing, a shaft revoluble in said casing, a pair of spiders mounted on said shaft and adapted to rotate therewith, a notched trackway in said casing, a cradle adapted to contain the articles to be treated and equipped with rollers adapted to travel on said trackway, and detachable connections between said cradle and spiders adapted to become operative upon the inward travel of the cradle on the trackway, the notches of the trackway permitting the cradle to rotate with the spiders when all of the cradle rollers are in register with said notches, substantially as described.

8. In a structure of the character described, the combination of a shell or casing, a shaft revoluble in said casing, a pair of spaced spiders mounted on said shaft and revoluble therewith, the outer spider being apertured, a notched trackway in said casing, a cradle adapted to contain the articles to be treated, wheels on said cradle adapted to travel on said trackway, the cradle being adapted during its insertion in the casing to pass through the aperture of said outer spider, a trunnion on the inner end of said cradle adapted to engage a trunnion bearing on the inner spider, a trunnion on the outer end of said cradle, a trunnion bearing-block on said outer trunnion, and a detachable connection between said bearing-block and the outer spider, the notches of said trackway being so located that all of the wheels of the cradle will register therewith only when the cradle is sufficiently inserted in the casing for its trunnions to be properly supported on the spiders, substantially as described.

9. In a device of the character described, the combination of a shell or casing, a shaft revoluble in said casing, supporting-means on said shaft, a trackway in said casing provided with unequally spaced notches, a cradle adapted to contain the articles to be treated, wheels on said cradle adapted to travel on said trackway, and detachable connections for said cradle and supporting-means, the cradle wheels being so spaced that whenever any pair of wheels registers with the trackway notches the remaining wheels will support the cradle on the trackway, except when all cradle wheels register with notches, in which case the cradle is free to revolve with the supporting-means, substantially as described.

In testimony whereof we have hereunto signed our names in the presence of two subscribing witnesses.

WILLIAM G. BORN.
JAMES L. LANE.

Witnesses:
LOUIS MOHR,
WALTER HAGEN.

Copies of this patent may be obtained for five cents each, by addressing the "Commissioner of Patents, Washington, D. C."